Sept. 1, 1959  P. W. HOUSE ET AL  2,902,125
ENGINE STARTING APPARATUS
Filed Aug. 11, 1955
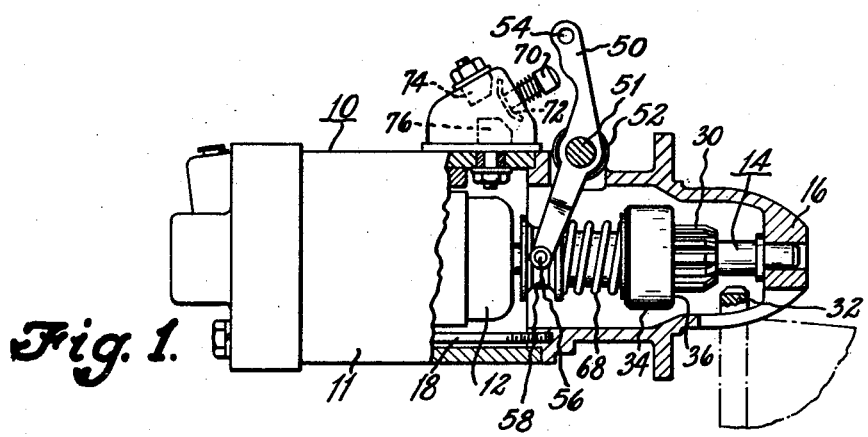
Fig. 1.
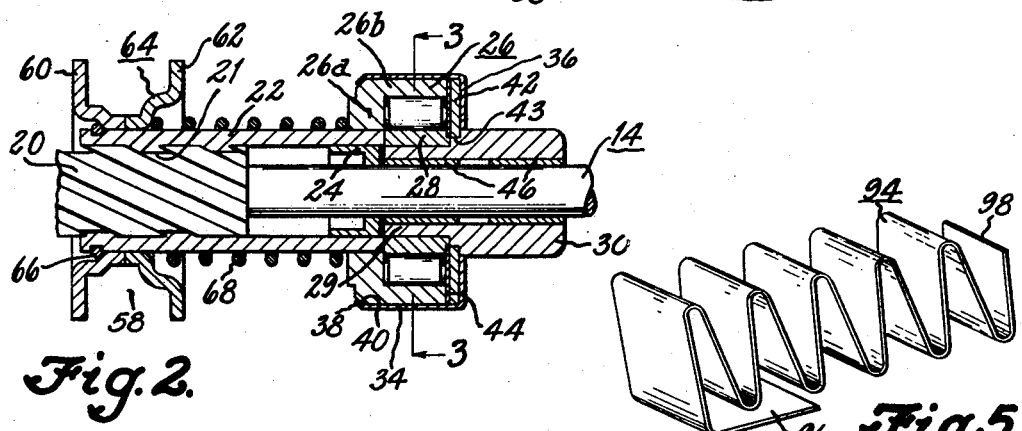
Fig. 2.
Fig. 5.
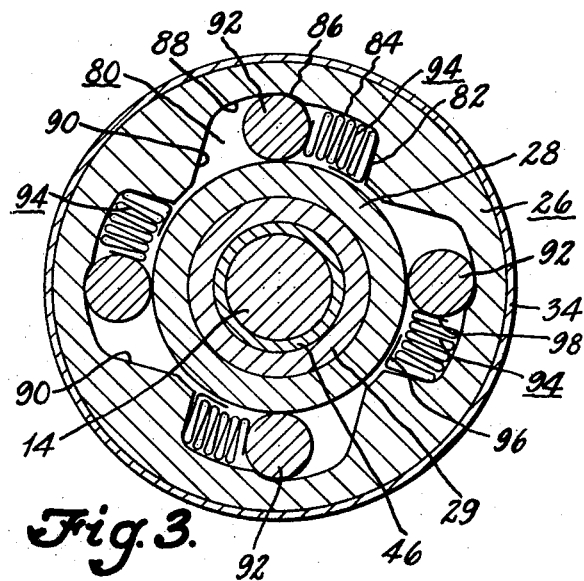
Fig. 3.
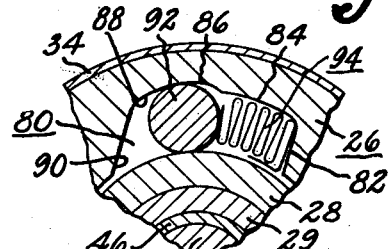
Fig. 4.
INVENTOR.
PERRY W. HOUSE
GEORGE B. SHAW
BRUCE D. GRIBBEN
By G. H. Strickland
ATTORNEY

United States Patent Office 2,902,125
Patented Sept. 1, 1959

2,902,125

ENGINE STARTING APPARATUS

Perry W. House, Pendleton, and George B. Shaw and Bruce D. Gribben, Anderson, Ind., assignors to General Motors Corporation, Detroit, Mich., a corporation of Delaware Application August 11, 1955, Serial No. 527,722

8 Claims. (Cl. 192—45)

This invention relates to engine starting apparatus and more particularly to one way over-running clutches designed primarily for use with electric starting motors to effect driving connection between such motor and the engine flywheel gear for rotating the engine crankshaft to start the engine, and to interrupt such connection when the engine starts to run under its own power.

Engine starting apparatus in common use at the present time includes a motor, a driving pinion movable into mesh with the flywheel gear of the engine and an over-running clutch for operatively connecting the motor and pinion which is released when the engine becomes self-operative and the pinion over-runs the motor. Such clutch generally comprises two concentric shells connected to the motor and pinion, respectively, between which rollers are received and which have a wedging action with camming surfaces formed on one or the other of such shells to establish a driving connection between the two shells. When the engine becomes self-operative, the driven shell over-runs the driving shell and the clutch is released.

It has been the general practice in over-running clutches of the character above referred to, to provide a plurality of roller receiving recesses in the driving member in which gripping rollers are positioned and which are provided with cam surfaces between which and the peripheral surface of the driven member the rollers are wedged when the clutch is engaged. It has also been the general practice to provide bores in the driving member which extend from said recesses to the outer periphery of the driving member and to provide in these bores helical springs which exert a pressure on the rollers urging them toward gripping position.

Clutches constructed in the manner described are open to certain objections. Because of the bores extending from the roller-receiving recesses to the outer periphery of the driving member, such member is structurally weakened and sometimes breakage of the member would occur upon application of heavy torque. To avoid this possibility, the clutch had to be made of parts having considerable mass which, of course, increased the cost. Also, a solid-ended sleeve was provided around one end of each spring to enable the force of the springs to be communicated evenly to the rollers. The provision of these sleeves also adds to the cost of the clutch.

It is the primary object of the present invention to provide a clutch, particularly for use in engine starting apparatus, which is of novel design and in which the above-mentioned difficulties are eliminated, also a clutch which can be made in much smaller size at considerably less cost and yet be capable of transmitting an equal or superior driving torque.

It is a further object of the invention to provide a clutch of this character in which the springs which urge the rollers to gripping position are of such construction that the springs can directly engage the rollers and the sleeves referred to previously can be eliminated.

Further objects and advantages of the present invention will be apparent from the following description, reference being had to the accompanying drawings wherein a preferred embodiment of the present invention is clearly shown.

In the drawings:

Figure 1 is a longitudinal view, partly in section, of an engine starting motor and associated clutch in which the present invention is embodied;

Figure 2 is a longitudinal view, partly in section, of the clutch and associated parts which comprise the starter drive;

Figure 3 is a section on the line 3—3 of Figure 2;

Figure 4 is a detail section similar to Figure 3 but showing some of the parts in a slightly different position;

Figure 5 is an enlarged perspective view of a spring employed in the clutch.

In the drawings, the numeral 10 designates an electric starting motor of conventional construction having a field frame 11, a rotating armature 12 and a drive shaft 14 on which the armature is supported and which rotates therewith. The motor, as shown, is of entirely conventional design and need not be further described.

The left end of the armature shaft, as seen in Fig. 1, is suitably journalled in an end plate (not shown) secured to the field frame 11 and the right end of such shaft is journalled in the wall of a housing 16 which surrounds the clutch and driving pinion and is suitably secured to the field frame by bolts 18.

The shaft 14 is enlarged as indicated in Fig. 2 and has external helical splines 20 formed thereon which cooperate with internal splines 21 formed on a sleeve 22 which is slidable on the shaft 14. By reason of the helical spline connection between the shaft and sleeve a sliding movement of the latter will effect a rotary movement of the sleeve to facilitate meshing of the driving pinion with the gear that is driven thereby, as will be more fully described later. Positioned in the right end of the sleeve is a bushing 24 which surrounds the shaft 14 and rotates on the shaft.

The right end of sleeve 22 supports an outer clutch shell 26 which may be welded or otherwise suitably secured to sleeve 22, or integral therewith. This shell has a part 26a normal to the axis of the shaft and an annular part 26b which surrounds the shaft and is spaced therefrom. Spaced from the part 26b of the outer clutch shell is an inner clutch shell 28 which is a ring having inner and outer cylindrical surfaces concentric with the outer clutch shell. The inner clutch shell is secured by welding, brazing or in any suitable way to a sleeve 29 integral with the driving pinion 30. The sleeve 22 is movable axially by means later described, to move the pinion into engagement with the engine flywheel gear 32, shown in Fig. 1, and is operative to rotate said gear to start the engine when the outer shell 26 of the clutch is rotatably connected to the inner shell 28, if the pinion is in engagement with said gear and the starting motor is energized so as to rotate the sleeve 22.

The inner and outer clutch shells are maintained in assembled relation by a metal shell having a part 34 concentric with the outer shell and engaging the outer surface of the part 26b and a part 36 normal thereto through which the pinion and sleeve 29 extend. The retaining shell has an inwardly bent edge 38 which engages a beveled surface 40 formed on the outer clutch shell 26, as shown in Fig. 2. A washer 42 surrounds a reduced part 43 of the pinion at the left end thereof which is beyond the teeth and has a circular periphery. This washer lies between the part 36 and another washer 44 which surrounds a reduced portion of the inner clutch shell 28 at the right end thereof. Obviously, this retaining shell will prevent any relative axial movement between the sleeve 22, outer clutch shell 26, inner clutch 28 and the pinion, the whole assembly being slidable as a unit on the armature shaft to effect engagement and disengagement of the pinion 30 with the gear 32 driven thereby. Pinion bearings 46 positioned within the pinion and sleeve 29 are journalled on the shaft 14, as indicated in Fig. 2.

The whole clutch assembly is moved to the right, as seen in Fig. 1, by a lever 50 pivoted on a stud 51 secured in any desirable way in the housing 16. The lever is normally held in the position shown in Fig. 1 by a torsion spring 52 and is adapted to be moved counter-clockwise to effect engagement of the pinion with a flywheel gear by a manual operating connection connected in the opening 54 at the upper end of the lever. It will be understood, however, that the manner in which the lever is operated is in no way material so far as the present invention is concerned and such lever may be actuated by an electromagnet, as disclosed in the patent to Dyer, 2,103,643, January 18, 1938, for example.

The lower end of lever 50 is bifurcated to provide two arms each of which has secured thereto a pin 56, each of which engages in a groove 58 on opposite sides of the armature shaft. The groove is formed between two flanges 60 and 62 of a collar 64 which is slidable on the sleeve 22. The collar 64 may be a single integral member or may be formed of two separate elements joined by welding or in some other suitable way as indicated in Fig. 2. A split ring 66 engages in a suitable groove in sleeve 22 to retain the collar on the sleeve and to limit the movement thereof to the left.

Movement of the collar 64 to the right, as seen in Fig. 1, exerts pressure on a spring 68 positioned between the collar and the clutch shell 26, and this effects movement of the entire clutch assembly and pinion 30 to the right. If the teeth of the pinion do not abut the teeth of the gear 32 when this movement takes place, the pinion moves freely into engagement with the flywheel gear 32 without opposition and when fully engaged, the starting motor switch is closed and rotation of the shaft 14 rotates the sleeve 22 and, through the clutch members 26 and 28, rotates the pinion 30 and gear 32 until the engine is started. When this takes place, the engine rotates the inner clutch shell 28 faster than the outer shell is rotated by the starting motor and the clutch is released, the lever 50 is released so that it can be returned to the Fig. 1 position by spring 52. This will effect disengagement of pinion 30 from the gear 32 and stopping of the starting motor.

If, upon movement of the clutch assembly and pinion to the right, the teeth of the pinion abut those of the gear 32 continued movement of the lever will compress the spring 68 until the lever effects closing of the starting motor switch. This will cause rotation of the shaft 14 and pinion 30 which will be moved out of position where its teeth abut those of the flywheel gear into proper meshing position. The spring will immediately expand, forcing the pinion into proper engagement with the flywheel gear, after which the action will be as previously described.

However, by use of the helical splines 20 and 21 tooth abutment is much less likely than where straight splines are employed because, during the axial movement of the clutch and pinion assembly toward the gear 32, the pinion is being rotated and will usually move into proper engagement with the gear 32 without tooth abutment.

In the specific embodiment of the invention which is shown in the drawings, the lever 50 is manually operable by any suitable form of operating connection which may be pivotally connected to the upper end of the lever. As the lever is moved to effect engagement of the pinion with gear 32, the upper part of said lever, after a predetermined movement thereof, engages a spring-held plunger 70 which carries a movable contact 72. Further movement of the lever moves the contact 72 into engagement with two fixed contacts 74 and 76 to close the starting motor circuit and cause the motor to rotate and crank the engine. When the lever is released, spring 52 returns it to normal position, opening the motor circuit and disengaging the pinion 30 from the flywheel gear 32.

As already indicated, the shifting lever 50 can be operated by an electromagnet instead of by manual means and such a construction is now generally in use. Such a magnet is rendered operative upon closing of the ignition switch or a special push-button or other instrumentality. In Fig. 2 of the Dyer patent the magnet is controlled by the ignition switch, while in Fig. 3, it is controlled by a special manually operable switch. When the electromagnet is employed to operate a shifting lever such as lever 50, the starter circuit is usually controlled by a switch operated by the magnet armature, as in Dyer, instead of being operated by the pinion shifting lever as shown herein.

The specific construction of the clutch, through the medium of which the motor rotates the pinion 30, will now be described. On the inner surface of the outer clutch shell which immediately surrounds the inner shell 28 are a plurality of recesses designated in their entirety by the reference numeral 80. The right end 82 of each of these recesses is of somewhat less depth than most of the balance of the recess and the outer surface 84 of this part of the recess is substantially concentric with the periphery of the outer clutch shell. Immediately adjacent the surface 84, the depth of the recess is increased as indicated at 86 and this part of the outer surface of the recess is arcuate and of substantially the same curvature as the periphery of the gripping rollers of the clutch, which will be later described. This arcuate surface is adjacent to and joints a camming surface 88, between which and the outer periphery of the inner shell 28 the clutch rollers are wedged when the clutch is operative, and this camming surface extends to the left side wall 90 of each recess, as shown in Fig. 3.

A gripping roller 92 is positioned in each recess and when the clutch is released, each roller is in the position shown in Fig. 3, that is, the roller is positioned between the arcuate surface 86 and the periphery of the shell 28. Positioned in each recess, between the surface 84 and the periphery of the shell 28 is a spring 94. One end of this spring engages the end wall 82 of the recess 80 and the other engages the roller 92 so that the springs tend to push the rollers toward their gripping positions between camming surfaces 88 and the periphery of the inner clutch shell 28. Each spring 94 is in the form of a flat, relatively thin steel ribbon which is somewhat flexible and can be readily bent into a number of corrugations, as shown in Fig. 5, so as to form a resilient spring member which will exert the desired pressure on the clutch rollers. At the right end each spring is bent, as indicated in Fig. 5, to form a lip which extends to the left and when the device is assembled, such lip lies between the corrugations of the spring and the peripheral surface of the inner clutch shell so as to form a sort of bearing surface which can contact the peripheral surface of the inner clutch shell and will prevent damage to the spring, which might otherwise be occasioned when the engine becomes self-operative, producing relative movement between the inner shell and the springs as the clutch is released. The other end 98 of the spring lies in a plane substantially normal to the longitudinal axis of the spring so that, when the device is assembled, such end of the spring is substantially in the position shown in Fig. 3, so that it will engage the roller 92 throughout its length.

For illustrative purposes the right end of spring 94 and the lip 96 are shown as spaced from wall 82 and the surface of member 28 but these several parts are actually in engagement.

When the starting motor is energized, the outer clutch shell is rotated in a clockwise direction as seen in Fig. 3 and this will effect movement of the parts to the position shown in Fig. 4, in which position the rollers 92 will be gripped between the camming surfaces 88 and the periphery of the inner clutch shell 28. This will effect rotation of the inner clutch shell and the pinion in a clockwise direction in order to start the engine. As soon as the engine becomes self-operative, the clutch shell 28 is rotated clockwise, as during starting, but at greater speed than the outer shell 26. Because of frictional engagement with the rollers 92, such rollers are moved back to the Fig. 3 position which will effect release of the clutch and this release is facilitated by the shape of the recesses 86. Since these surfaces are of substantially the same curvature as the rollers and the space between such surfaces and the inner clutch shell is a little greater than the diameter of the rollers, there is substantially no tendency for the rollers to bind and the release of the clutch takes place substantially immediately when the rollers are restored to the Fig. 3 position.

It should be noted particularly that the recesses 80, in which both the rollers 92 and the springs 94 are positioned, are on the inner periphery of the outer clutch shell 26 and no part of such recesses or any passage or bore connecting therewith extends through the shell 26 to the outer periphery thereof. In clutches of this type, as previously used, it was generally the custom to form the recesses in which the clutch rollers are positioned on the inner periphery of the outer clutch shell and to position the cooperating springs in bores extending from the recesses to the outer periphery of the clutch shell, or to provide the roller retaining recesses in the outer periphery of the inner clutch shell with spring retaining bores extending from such recesses toward the outer periphery of such shell.

In either case, the cross-sectional area of certain parts of the clutch shells adjacent the bores referred to was so much reduced to the formation of the bores that the strength of the parts was found to be inadequate and breakage occurred, upon occasions, with application of heavy torque. This difficulty has been entirely eliminated in the present design as the weakest part of the shell 26 is that adjacent the surface 86 and that is amply strong to permit the size of the clutch to be very much reduced without danger of breakage, thus effecting a substantial reduction in cost due to saving of material effected by reduction in size of the clutch.

In earlier devices of this general type, it was also customary to employ in cooperation with the clutch rollers ordinary helical springs, one end of which extended into a sleeve having one end substantially closed, which was pressed by the spring into engagement with the associated roller in order to have a flat surface engaging the roller and insure the application of force by the spring in a direction normal to the axis of the roller. When a spring such as shown herein is used, the necessity of employing the sleeve referred to is eliminated as a flat surface of the spring itself directly engages the associated roller.

Another advantage in using a spring such as disclosed arises from the fact that the spring as a unit is of substantially rectangular cross-section and is positioned in a substantially rectangular part of the recess 80 in which the spring fits relatively closely when the device is assembled so that any rotary movement of the spring in the recess is positively prevented.

Another advantage of the disclosed construction is facility of assembling. The rollers 92 and the springs 94 are positioned in the recesses 80 by insertion therein from the right end before the retaining washers and the cover 34 are secured in position and this can be done much more easily than the springs and cooperating sleeves can be inserted in the bores in which such elements are positioned in the earlier devices above referred to.

Other advantages such as produced by the lip 96 of the spring 94 and the surface 86 of the roller retaining recess have already been referred to.

While the embodiment of the present invention as herein disclosed constitutes a preferred form, it is to be understood that other forms might be adopted.

What is claimed is as follows:

1. A one way over-running clutch for connecting a starting motor with a starter pinion to crank an engine and for permitting the pinion to over-run the motor when the engine becomes self-operative, said clutch comprising an outer driving member adapted to be connected with the motor and an inner driven member adapted to be connected with the pinion concentrically mounted for rotation, means for connecting said driving and driven members in driving relation to each other including a plurality of roller receiving recesses formed on the inner surface of the driving member and facing said driven member, each of said recesses terminating a substantial distance from the outer periphery of the driving member and having a cam surface between which and the outer periphery of the driven member a roller of predetermined diameter is adapted to be wedged when driving relation is established between the driving and driven members, said recesses each defining a first area wherein the radial distance between the driven member and the wall of the recess is substantially equal to the diameter of said roller and defining a second area wherein the said radial distance is less than the diameter of said roller, a plurality of rollers one of which is positioned in each first recess area and a corrugated spring in each second recess area having substantially flat end walls on opposite ends engaging the roller and one end wall of said recess, said spring exerting a force tending to move said roller to wedging position.

2. A one way over-running clutch for connecting a starting motor with a pinion to crank an engine and for permitting the pinion to over-run the motor when the the engine becomes self-operative, comprising an outer driving member adapted to be connected with the motor and an inner driven member adapted to be connected with the pinion concentrically mounted for rotation, means for connecting said driving and driven members in driving relation to each other including a plurality of roller receiving recesses formed on the inner surface of the driving member and facing said driven member, each of said recesses terminating a substantial distance from the outer periphery of the driving member, each of said recesses having a cam surface engageable by the associated roller when driving relation is established between the clutch members and an arcuate surface at one end of said cam surface adjacent which the roller is positioned when the clutch is disengaged, said recesses each defining a first area wherein the radial distance between the driven member and the wall of the recess is substantially equal to the diameter of said roller and defining a second area wherein the said radial distance is less than the diameter of said roller, a roller in each first recess area and a convoluted compression spring in each second recess area between the roller and one end wall of each recess biasing said roller toward the cam surface.

3. A one way over-running clutch for connecting a starter motor with a pinion to crank an engine and for permitting the pinion to over-run the motor when the engine becomes self-operative, comprising an outer driving member adapted to be connected with the motor and an inner driven member adapted to be connected with the pinion concentrically mounted for rotation, means for connecting said driving an driven members in driving relation to each other including a plurality of roller receiving recesses formed on the inner surface of the driving member and facing said driven member, each of said recesses terminating a substantial distance from the outer periphery of the driving member, each of said recesses having a cam surface engageable by the associated roller when driving relation is established between the clutch members and an arcuate surface substantially concentric with the roller adjacent which the roller is positioned when the clutch is disengaged, a roller in each of said recesses, a convoluted compression spring between the roller and the end wall of each recess biasing the said roller toward the cam surface, and shoulder means associated with each recess and integral with the said inner surface of said driving member for maintaining each roller at a predetermined distance from the said end wall of said recess.

4. A one way over-running clutch for connecting a starter motor with a pinion to crank an engine and for permitting the pinion to over-run the motor when the engine becomes self-operative, comprising an outer driving member adapted to be connected with the motor and an inner driven member adapted to be connected with the pinion concentrically mounted for rotation, means for connecting said driving and driven members in driving relation to each other including a plurality of roller receiving recesses formed on the inner surface of the driving member and facing said driven member, each of said recesses terminating a substantial distance from the outer periphery of the driving member, each of said recesses having a cam surface engageable by the associated roller when driving relation is established between the clutch members and an arcuate surface at one end of said cam surface adjacent which the roller is positioned when the clutch is disengaged, said arcuate surface being spaced from the periphery of the inner clutch member a distance greater than the diameter of the associated roller and terminating at one end thereof at a point spaced from the inner clutch member a lesser distance than the diameter of the associated roller, a roller in each recess and a convoluted compression spring between the roller and one end wall of each recess biasing said roller toward the cam surface.

5. A one way over-running clutch for connecting a starter motor with a pinion to crank an engine and for permitting the pinion to over-run the motor when the engine becomes self-operative, comprising; an outer driving member adapted to be connected with the motor and an inner driven member adapted to be connected with the pinion concentrically mounted for rotation, means for connecting said driving and driven members in driving relation to each other including a plurality of roller receiving recesses formed on the inner surface of the driving member, each of said recesses terminating a substantial distance from the outer periphery of the driving member and having a cam surface between which and the outer periphery of the driven member a roller is adapted to be wedged when driving relation is established between the driving and driven members, a plurality of rollers one of which is positioned in each recess and a spring in each recess between the roller and one end wall of said recess, said spring exerting a force tending to move said roller to wedging position, said spring being a corrugated flat metal strip having flat surfaces at the ends engageable with the roller and an end wall of the spring retaining recess and said spring also having an extension at the end which engages the end wall of the spring retaining recess, said extension projecting between the corrugations of the spring and the periphery of the driven clutch member, when the device is assembled.

6. A one way over-running clutch for connecting a starter motor with a pinion to crank an engine and for permitting the pinion to over-run the motor when the engine becomes self-operative, comprising; an outer driving member adapted to be connected with the motor and an inner driven member adapted to be connected with the pinion concentrically mounted for rotation, means for connecting said driving and driven members in driving relation to each other including a plurality of roller receiving recesses formed on the inner surface of the driving member, each of said recesses terminating a substantial distance from the outer periphery of the driving member and having a cam surface between which and the outer periphery of the driven member a roller is adapted to be wedged when driving relation is established between the driving and driven members, a plurality of rollers one of which is positioned in each recess and a spring in each recess between the roller and one end wall of said recess, said spring exerting a force tending to move said roller to wedging position, said spring being a corrugated flat metal strip having flat surfaces at the ends engageable with the roller and an end wall of the spring retaining recess and said spring having a bent portion at its end which engages the end wall of the spring retaining recess, said bent portion extending in a direction substantially normal to the roller engaging surface and positioned between the corrugations of the spring and the periphery of the driven clutch member when the device is assembled.

7. An over-running clutch for connecting a prime mover to an element driven thereby having in combination driving and driven members concentrically mounted for rotation means for connecting said members in driving relation, including a plurality of recesses on the inner surface of the driving member each of which terminates a substantial distance from the outer periphery of said driving member and has a cam surface formed thereon, a roller in each of said recesses movable into a position to be wedged between said cam surface and the outer periphery of the driven member and a spring positioned between the roller and one end of each recess biasing the roller toward wedging position, said spring being a corrugated flat metal strip having flat surfaces at its opposite ends engageable with the roller and the end of the recess, an dhaving a bent portion at its end which engages the end of the recess, said bent portion extending in a direction substantially normal to the roller engaging surface and positioned between the corrugations of the spring and the periphery of the driven clutch member when the device is assembled.

8. A one-way overrunning clutch for connecting a starting motor with a starter pinion to crank an engine and for permitting the pinion to overrun the motor when the engine becomes self-operative, said clutch comprising; an outer driving member adapted to be connected with the motor and an inner driven member adapted to be connected with the pinion concentrically mounted for rotation, means for connecting said driving and driven members in driving relation to each other including a plurality of roller-receiving recesses formed on the inner surface of the driving member and facing said driven member, each of said recesses terminating a substantial distance from the outer periphery of the driving member and having a cam surface between which and the outer periphery of the driven member a roller of predetermined diameter is adapted to be wedged when driving relation is established between the driving and the driven members, said recesses each defining a first area wherein the radial distance between the driven member and the wall of the recess is substantially equal to the diameter of said roller and defining a second area wherein the radial distance is less than the diameter of said roller, a plurality of rollers, one of which is positioned in each first recess, and a convoluted compression spring in each second recess area having ends engaging the roller and one end wall of said recess, said spring exerting a force tending to move said roller to wedging position.

References Cited in the file of this patent

UNITED STATES PATENTS

| 300,503 | Rascoe | June 17, 1884 |
| 800,853 | Kimball | Oct. 3, 1905 |
| 2,154,212 | Moorhouse | Apr. 11, 1939 |
| 2,211,053 | Critchfield | Aug. 13, 1940 |
| 2,371,653 | Schuckers | Mar. 20, 1948 |
| 2,691,896 | Stageberg | Oct. 19, 1954 |